(12) United States Patent
Rencher et al.

(10) Patent No.: US 10,096,159 B2
(45) Date of Patent: Oct. 9, 2018

(54) ANALYSIS OF OBJECT MOVEMENT WITHIN AN ENVIRONMENT

(71) Applicant: THE BOEING COMPANY, Chicago, IL (US)

(72) Inventors: Robert John Rencher, Normandy Park, WA (US); Guijun Wang, Seattle, WA (US); John W. Glatfelter, Ridley Park, PA (US); Roland Nelson Freeman, North Charleston, SC (US); David Wayne Nelson, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 267 days.

(21) Appl. No.: 15/258,554

(22) Filed: Sep. 7, 2016

(65) Prior Publication Data

US 2018/0066951 A1 Mar. 8, 2018

(51) Int. Cl.
*G06T 19/00* (2011.01)
*G01C 21/26* (2006.01)

(52) U.S. Cl.
CPC ............ *G06T 19/003* (2013.01); *G01C 21/26* (2013.01); *G06T 2219/00* (2013.01)

(58) Field of Classification Search
CPC ....... B25J 9/163; B25J 9/1697; G06T 19/003; G06T 7/0065
See application file for complete search history.

(56) References Cited

U.S. PATENT DOCUMENTS 9,630,320 B1 * 4/2017 Konolige ................. B25J 9/163

FOREIGN PATENT DOCUMENTS

WO    WO-2017119879 A1 * 7/2017 ............. G06T 19/00

* cited by examiner

*Primary Examiner* — Anne M Antonucci
(74) *Attorney, Agent, or Firm* — Womble Bond Dickinson (US) LLP

(57) ABSTRACT

An apparatus is provided for directing movement of a physical object within a three-dimensional (3D) navigable region of an environment. Generally, the apparatus divides the navigable region into geometric segments, and assigns a sequence of the geometric segments from a location to a destination to, and for movement of, the physical object. That is, the apparatus assigns a next geometric segment to the physical object moving in a current geometric segment in the sequence. The next geometric segment is then analyzed based on operational parameters of the physical object and a condition of the environment. In at least one increment, the next geometric segment is adjusted and reassigned to the physical object based thereon. Thereafter, the apparatus directs the physical object to move from the current geometric segment into the next geometric segment so assigned, or into the next geometric segment so reassigned in the at least one increment.

21 Claims, 6 Drawing Sheets

ANALYSIS OF OBJECT MOVEMENT WITHIN AN ENVIRONMENT

TECHNOLOGICAL FIELD

The present disclosure relates generally to directing movement of physical objects within an environment and, in particular, to analyzing static and dynamic objects or characteristics within the environment to improve the movement of physical objects.

BACKGROUND

Historically, technology has been utilized to organize and enhance humanistic physical awareness of environments. For example, existing systems for managing objects at rest and in motion have been developed based on human observation, response and control capabilities. These innovations have primarily enhanced the human senses of sight, hearing and perceived motion. In particular, technological advances have led to an aggregation technology in which machines are able to leverage human sensory functions along with additional sensing technologies to view, interact and synthesize a physical environment from a digital perspective. However, these innovations have design limits with respect to the complexity of the data that can be sensed, processed, synthesized, and/or derived therefrom.

Therefore, it may be desirable to have a system and method that take into account at least some of the issues discussed above, as well as possibly other issues.

BRIEF SUMMARY

Example implementations of the present disclosure are directed to an improved system, method and computer-readable storage medium for directing movement of a physical object from a location to a destination within a three-dimensional (3D) navigable region of an environment. Using the system to characterize and digitally represent the environment, the movement of the physical object may be monitored, evaluated, controlled and, in some instances, improved. In particular, the system may analyze static and dynamic objects or characteristics within an environment to improve the direction of, or provide authorization for, the movement of physical objects therein. This may reduce the effort required to move physical objects, and also expedite the ability to move the physical objects.

In some example implementations, a method is provided for directing movement of a physical object from a location to a destination within a three-dimensional (3D) navigable region of an environment. The method comprises dividing the navigable region into a plurality of geometric segments between the location to the destination that are assignable to the physical object. Each geometric segment has a dimension proportional to operational parameters of the physical object and including at least a speed of the physical object. The method also includes assigning a sequence of geometric segments from the location to the destination for movement of the physical object. The geometric segments of the sequence are assigned incrementally.

Each increment includes assigning a next geometric segment to the physical object moving in a current geometric segment in the sequence, and analyzing the next geometric segment based on the operational parameters of the physical object in the current geometric segment and a condition of the environment in the next geometric segment. Based thereon in at least one increment, the increment also includes adjusting the dimension of the next geometric segment that is proportional to the operational parameters of the physical object, and reassigning the next segment to the physical object based on the dimension so adjusted. Thereafter, each increment also includes directing the physical object to move from the current geometric segment into the next geometric segment so assigned, or into the next geometric segment so reassigned in the at least one increment.

In some example implementations of the method of the preceding or any subsequent example implementation, or any combination thereof, adjusting the dimension of the next geometric segment includes subdividing the next geometric segment into geometric sub-segments along the dimension that is proportional to the operational parameters of the physical object, and reassigning the next geometric segment includes assigning at least some but not all of the geometric sub-segments to the physical object.

In some example implementations of the method of any preceding or any subsequent example implementation, or any combination thereof, adjusting the dimension of the next geometric segment includes combining the next geometric segment with an adjacent geometric segment to produce a combined geometric segment, and reassigning the next geometric segment includes assigning the combined geometric segment to the physical object.

In some example implementations of the method of any preceding or any subsequent example implementation, or any combination thereof, each of the plurality of geometric segments has a respective plurality of dimensions including the dimension proportional to the operational parameters including at least the speed of the physical object, and that is defined to enable safe movement of the physical object therein.

In some example implementations of the method of any preceding or any subsequent example implementation, or any combination thereof, analyzing the next geometric segment includes analyzing the next geometric segment based on at least one of a design weight, active weight, electromagnetic signature, motion energy, acceleration, depth of tire tread or thickness of brake lining of the physical object.

In some example implementations of the method of any preceding or any subsequent example implementation, or any combination thereof, assigning the next geometric segment includes assigning the next geometric segment based on at least a priority ranking of the physical object relative to others of a plurality of physical objects including the physical object to which the plurality of geometric segments are assignable, each geometric segment being assignable to only one of the plurality of physical objects at a time.

In some example implementations of the method of any preceding or any subsequent example implementation, or any combination thereof, in at least one increment, assigning the next geometric segment includes assigning the next geometric segment to the physical object over another of the plurality of physical objects having a lower priority ranking.

In some example implementations, an apparatus is provided for directing movement of a physical object from a location to a destination within a 3D navigable region of an environment. The apparatus comprises a processor and a memory storing executable instructions that, in response to execution by the processor, cause the apparatus to implement a number of subsystems, such as a segmentation engine and optimization engine that may be configured to at least perform the method of any preceding example implementation, or any combination thereof.

In some example implementations, a computer-readable storage medium is provided for directing movement of a physical object from a location to a destination within a 3D navigable region of an environment. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

Figure 1:
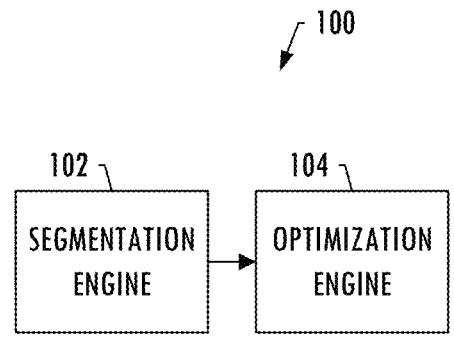
FIG. 1 is an illustration of a system for analysis and optimization of physical object movement, according to example implementations of the present disclosure.
Figure 4:
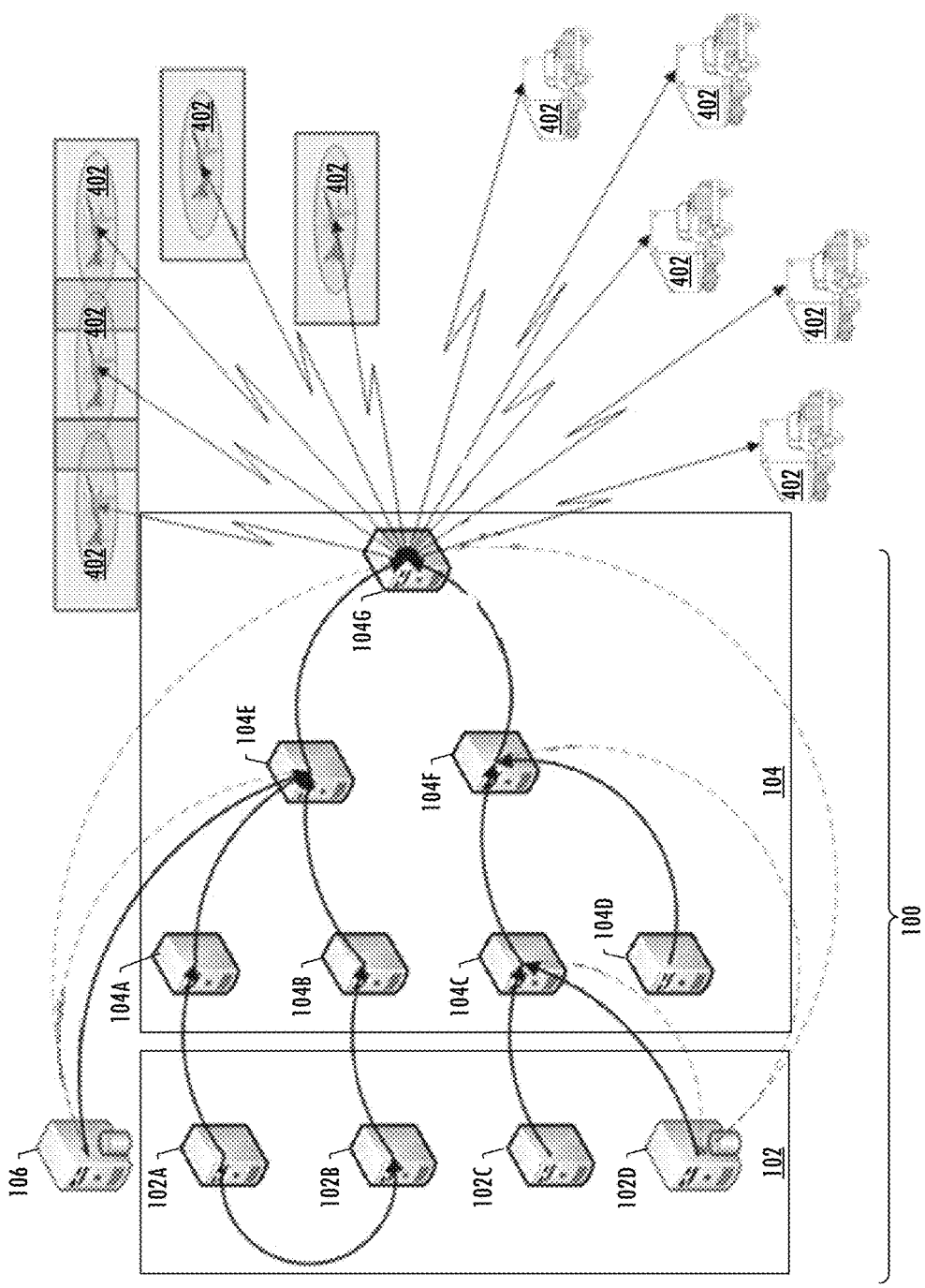
Figure 5:
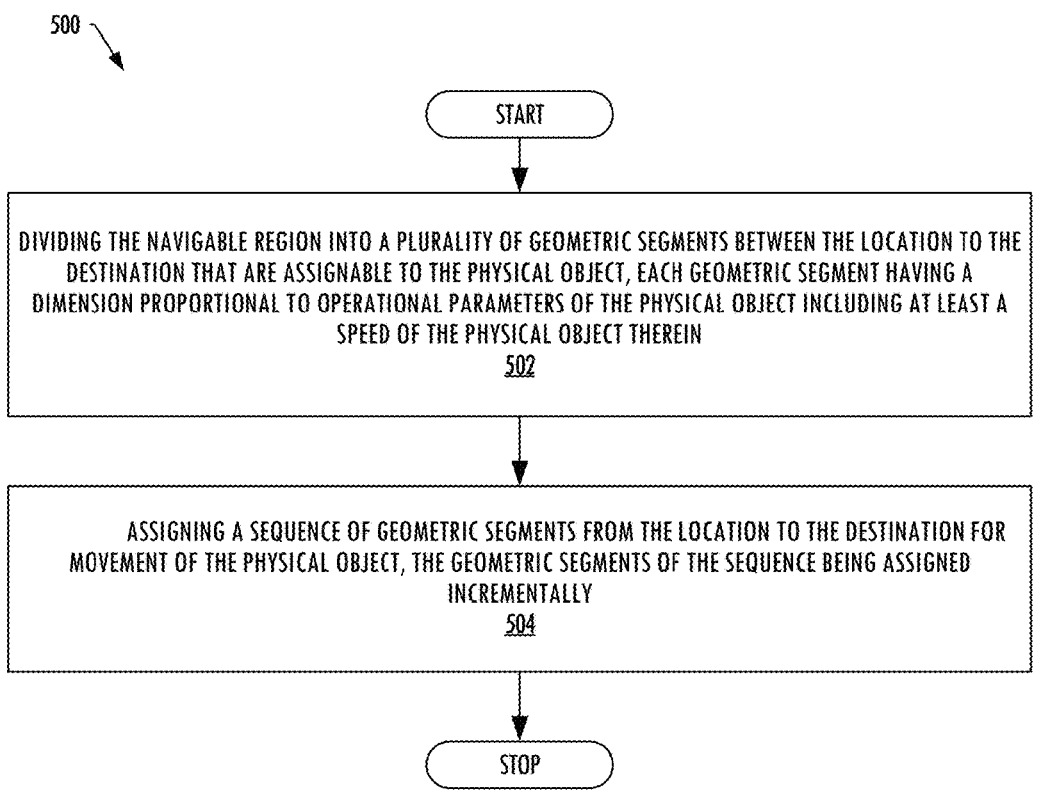
Figure 6:
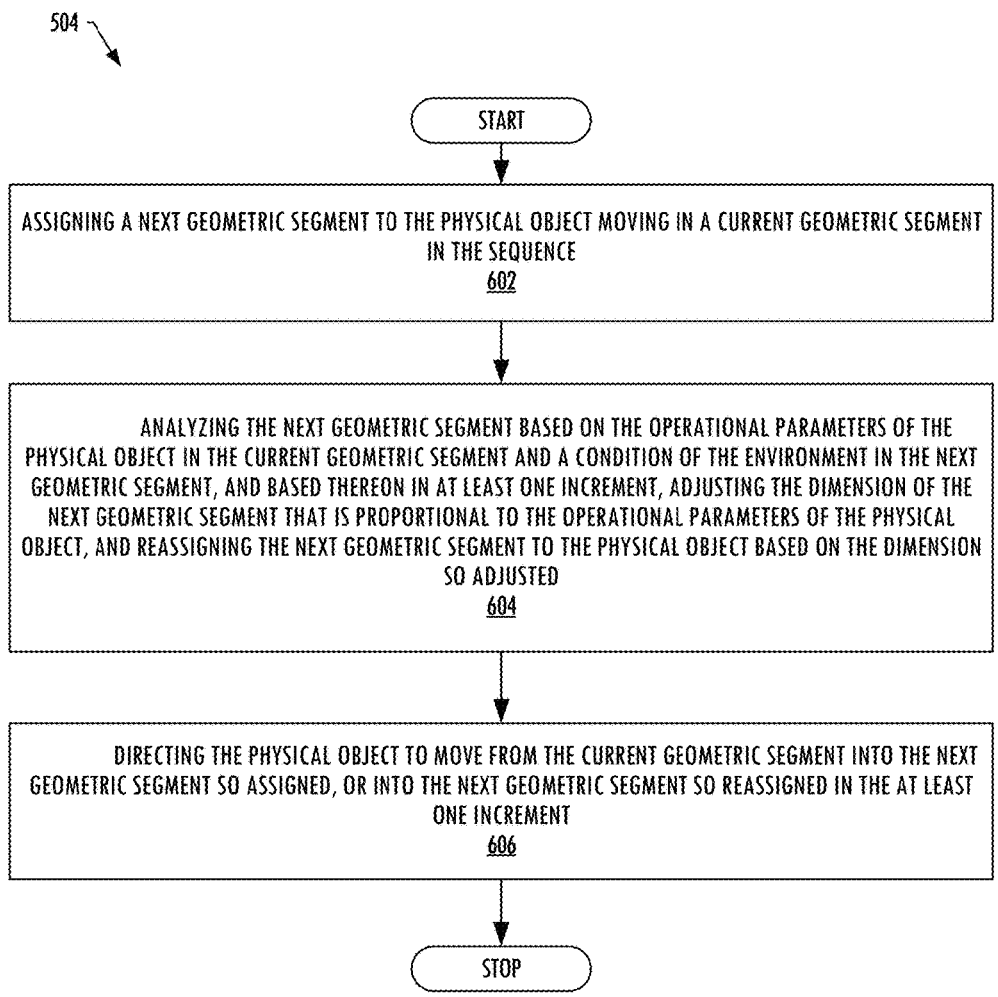
Figure 7:
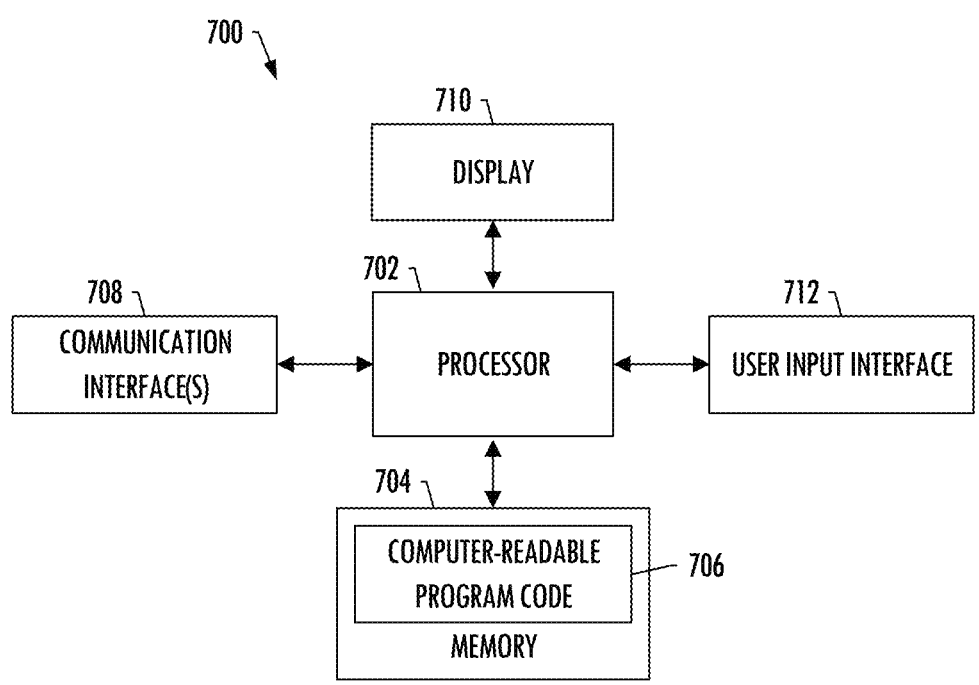

FIG. 4 more particularly illustrates the system of FIG. 1, according to example implementations of the present disclosure;

FIGS. 5 and 6 are flow diagrams illustrating various operations of a method for analysis and optimization of physical object movement, in accordance with an example implementation; and FIG. 7 illustrates an apparatus according to some example implementations.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to directing movement of physical objects within an environment and, in particular, to analyzing static and dynamic objects or characteristics within the environment to improve directing the movement of the physical objects based thereon. Example implementations will be primarily described in conjunction with autonomous vehicle technology, and trajectory prediction and optimization applications. It should be understood, however, that example implementations may be utilized in conjunction with a variety of other applications such as applications within the aerospace or manufacturing industries. The variety of other applications may include, for example, applications for optimizing traffic flow and management, optimizing horizontal and vertical separation during flight, or improving routing of an aircraft vehicle. It should be noted that as used herein a physical object may refer to machine or a vehicular terminal such as a land vehicle, aircraft, spacecraft, watercraft or fixed base autonomous assembly arm robotics such as factory assembly line robotics.

Example implementations of the present disclosure may facilitate providing a digital definition, characterization and management of physical objects that move, the space in which the objects move, the relationship and interaction of the object to the space, and the relationship between objects and changes in their attributes as they move through space. As used herein, the term "space" may refer to a physically navigable area such as within the land, sea or air. These definitions may be utilized to model the behavior of physical objects in motion, relative to advances in sensor and analytics technology, to optimize resource utilization, reliability, safety and operational effectiveness of an object by minimizing dependency on humanistic sensing responsiveness.

FIG. 1 illustrates a system 100 for analysis and optimization of physical object movement according to example implementations of the present disclosure, which may simply be referred to as the "system" herein. The system may be configured to perform a number of different functions or operations, either automatically, under direct operator control, or some combination of thereof. In this regard, the system may be configured to perform one or more of its functions or operations automatically, that is, without being directly controlled by an operator. Additionally or alternatively, the system may be configured to perform one or more of its functions or operations under direct operator control.

In accordance with example implementations of the present disclosure, the system 100 is configured to perform various functions or operations to direct movement of a physical object from a location to a destination within a three-dimensional (3D) navigable region of an environment. In some example implementations, the system is configured divide the navigable region into a plurality of geometric segments between the location to the destination. Each geometric segment has a dimension that is proportional to operational parameters of the physical object in which the operational parameters include at least a speed of the physical object. The system is configured to assign a sequence of geometric segments from the location to the destination for movement of the physical object in which the geometric segments of the sequence may be assigned incrementally to the physical object.

More particularly in these example implementations, in each increment, the system 100 is configured to assign a next geometric segment to a physical object moving in a current geometric segment in the sequence. The system is also configured to analyze the next geometric segment based on the operational parameters of the physical object in the current geometric segment and based on a condition of the environment in the next geometric segment. In some increments, the system is also configured to adjust the dimension of the next geometric segment that is proportional to the operational parameters of the physical object, and reassign the next geometric segment to the physical object based on the dimension so adjusted. Thereafter, the system directs the physical object to move from the current geometric segment into the next geometric segment so assigned, or into the next geometric segment so reassigned in the at least one increment.

The system 100 may include one or more of each of a number of different subsystems (each an individual system) coupled to one another for performing one or more functions or operations. As shown in FIG. 1, for example, the system may include a segmentation engine 102 and optimization engine 104 that may be coupled to one another. Although shown as part of the system, the segmentation engine or optimization engine may instead be separate from but in communication with the system. It should also be understood that either of the subsystems may function or operate as a separate system without regard to others of the subsystems. And further, it should be understood that the system may include one or more additional or alternative subsystems than those shown in FIG. 1.

As explained in greater detail below, the segmentation engine 102 and optimization engine 104 may be configured to perform respective functions or operations of the system 100. In some implementations, the segmentation engine is configured to divide the navigable region into a plurality of geometric segments between the location and the destination (e.g., a current location of the physical object to a destination of the physical object). The plurality of geometric segments is assignable to the physical object, and each geometric segment has a dimension that is proportional to operational parameters of the physical object therein. In these implementations, the operational parameters include at least a speed of the physical object therein. In some examples, the operational parameters also include static or dynamic parameters such as a mass, design weight, active weight, electromagnetic signature, planned trajectory, observed trajectory, or rate of speed change of the physical object. In some implementations, the dimension may be further proportional at least one of these static or dynamic parameters. For example, the dimension may be proportional to the mass of the physical object. In a more particular example in which the physical object is a large truck, the mass of the large land vehicle (e.g., a truck) may be significantly larger than a conventional land vehicle. As a result, the separation distance, and more particularly the size of the geometric segment having the large vehicle therein, is increased as relative mass impacts the stopping and acceleration parameters of a vehicle.

The operational parameters may be derived from information regarding the physical object, and thus the operational parameters may vary based on the type of object. For instance, in some examples, the physical object is a land vehicle and the operational parameters include the depth of tire tread or thickness of the brake lining of the vehicle. In other examples, the physical object is an aircraft vehicle and the operational parameters include the altitude and rate of altitude change of the aircraft.

In some implementations, each of the plurality of geometric segments has a respective plurality of dimensions that are defined to enable safe movement of the physical object therein, and that include the dimension proportional to the operational parameters of the physical object, for example. In some implementations, the dimensions of the segment reflect a size of the geometric segments. Additionally, in some examples, the dimensions include a time constant associated with the geometric segment. For example, the dimension may include a fixed time at which the physical object traverses the geometric segment and the fixed time may be directly proportional to the speed of the physical object within the geometric segment.

The optimization engine 104 is configured to optimize and assign a sequence of geometric segments from the location to the destination for movement of the physical object. The geometric segments of the sequence are assigned incrementally to the physical object.

Figure 2:
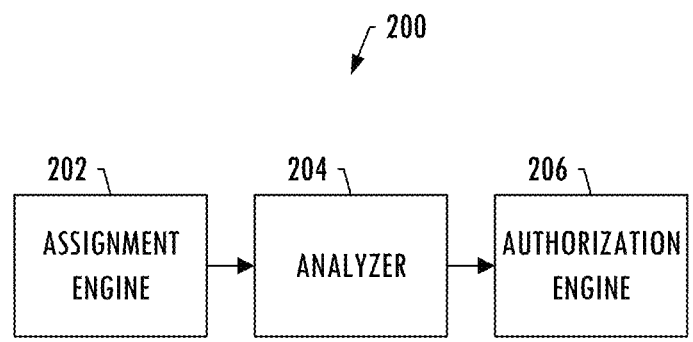
FIG. 2 is an illustration of an optimization engine of the system of FIG. 1, according to example implementations of the present disclosure.

FIG. 2 illustrates a suitable example of an optimization engine 200 that may in some examples correspond to the optimization engine of FIG. 1. As shown, in some implementations, the optimization engine includes an assignment engine 202, an analyzer 204 and an authorization engine 206 that may be coupled to one another for performing one or more functions or operations, for each increment, to assign a geometric segment of the sequence to the physical object and direct the physical object thereto.

More particularly, the physical object is incrementally directed from a current geometric segment of the sequence to a next geometric segment of the sequence until arriving at the location. As used herein, a "current geometric segment" may refer to the segment in which physical object is positioned at the present instant in time, and the "next geometric segment" may refer to a segment that is adjacent to the current geometric segment. The assignment engine 202 is configured to assign a next geometric segment to a physical object moving in a current geometric segment in the sequence. In some examples, the next geometric segment is assigned based on at least a predefined goal and priority ranking of the physical object. In some implementations, the predefined goal is or includes at least one of a time efficiency, fuel efficiency or trajectory goal.

In some implementations, the physical object is one of a plurality of physical objects to which the plurality of geometric segments are assignable, and each geometric segment is assignable to only one of the plurality of physical objects at a time. In these implementations, the priority ranking of the physical object is relative to others of the plurality of physical objects. Further, in these implementations, the assignment engine 202 is configured to assign the next geometric segment to the physical object over another of the plurality of physical objects that has a lower priority ranking. That is, another geometric segment is assigned to the other physical object.

The analyzer 204 may then analyze the next geometric segment based on the operational parameters of the physical object in the current segment, and a condition of the environment in the next geometric segment. That is, the analyzer may analyze the next geometric segment while the physical object is still moving within the current geometric segment. The condition of the environment may be or include at least one of a precipitation condition, air temperature, surface temperature, wind speed, wind direction, particulate matter, humidity, atmospheric pressure, salinity or electromagnetic radiation of the environment. Additionally, in some instances, the condition of the environment may include characteristics of another object in the environment such as the position of a static object that may affect the trajectory of the physical object while moving from the location to the destination.

In some examples, the next geometric segment may be analyzed based on a delta value of the operational parameter between the current geometric segment and the next geometric segment. In some implementations, one or more predictive analysis algorithms are utilized to analyze the physical object entering a next geometric segment, the conditions therein, and optimize the size of the next geometric segment. In particular, the analysis may utilize data from a physical object expected to enter the next geometric segment in which the data reflects the current operational parameters of the physical object. The data may be derived from various sensors on or within the physical object. The analysis may also utilize data from physical objects that are currently within or exiting the next geometric segment that reflect the actual (e.g., real-time or near real-time) conditions of the next geometric segment.

As previously indicated, the analyzer 204 analyzes the next geometric segment while the physical object is still moving within the current geometric segment. As such, the analysis may vary based on the type of physical object or the conditions of the environment. For example, in an implementation in which the physical object is a land vehicle on a solid surface (e.g., a road), the ambient temperature of the road and the tread depth of the vehicle's tires may be utilized to determine the amount of surface tension between the road and the tires. This information is then analyzed to estimate the vehicle stopping distance. The stopping distance may be utilized to determine the size of the geometric segment, for example. In another example implementation in which the physical object is an aircraft vehicle, the ambient temperature of the wing surface of the aircraft vehicle and the ambient air temperature may be analyzed to determine the formation of ice crystals on the wing surface. In this implementation, the adjustment in airspeed relative to the required lift effects adjustments to the size of the geometric segment.

In some implementations, the analyzer is configured to analyze the next geometric segment based on the operational parameters including at least the speed of the physical object in the current segment, and further including at least one of a design weight, active weight, electromagnetic signature, motion energy, acceleration, depth of tire tread or thickness of brake lining of the physical object. It should be noted that the operational parameters may further include a number of other parameters not explicitly contemplated herein in which the next geometric segment may be further analyzed based on at least one of the number of other operational parameters.

In at least one increment, the analyzer 204 is configured to also adjust the dimension of the next geometric segment that is proportional to the operational parameters of the physical object. In this at least one increment, the assignment engine 202 is further configured to reassign the next geometric segment to the physical object based on the adjusted dimension.

In some increments, the analyzer 204 is configured to adjust the dimension of the next geometric segment by subdividing the next geometric segment into geometric sub-segments along the dimension that is proportional to the operational parameters of the physical object, and the assignment engine 202 is configured to reassign the next geometric segment by assigning at least some but not all of the sub-segments to the physical object Alternatively, in some increments, the analyzer is configured to adjust the dimension of the next geometric segment by combining the next geometric segment with an adjacent geometric segment. In particular, the next geometric segment is combined with the adjacent geometric segment to produce a combined geometric segment, and the assignment engine is configured to reassign the next geometric segment by assigning the combined geometric segment to the physical object.

After the analysis, and in some instances the adjustment and reassignment, of the next geometric segment, the authorization engine 206 is configured to direct the physical object to move from the current geometric segment into the next geometric segment so assigned, or into the next geometric segment so reassigned in the at least one increment. In some implementations, directing the physical object to move may be or include authorizing the physical object to move into the next segment in which the authorization may be transmitted by the authorization engine to a controller of the physical object that is configured to direct the physical object into the next segment based at least in part on the authorization.

Figure 3:
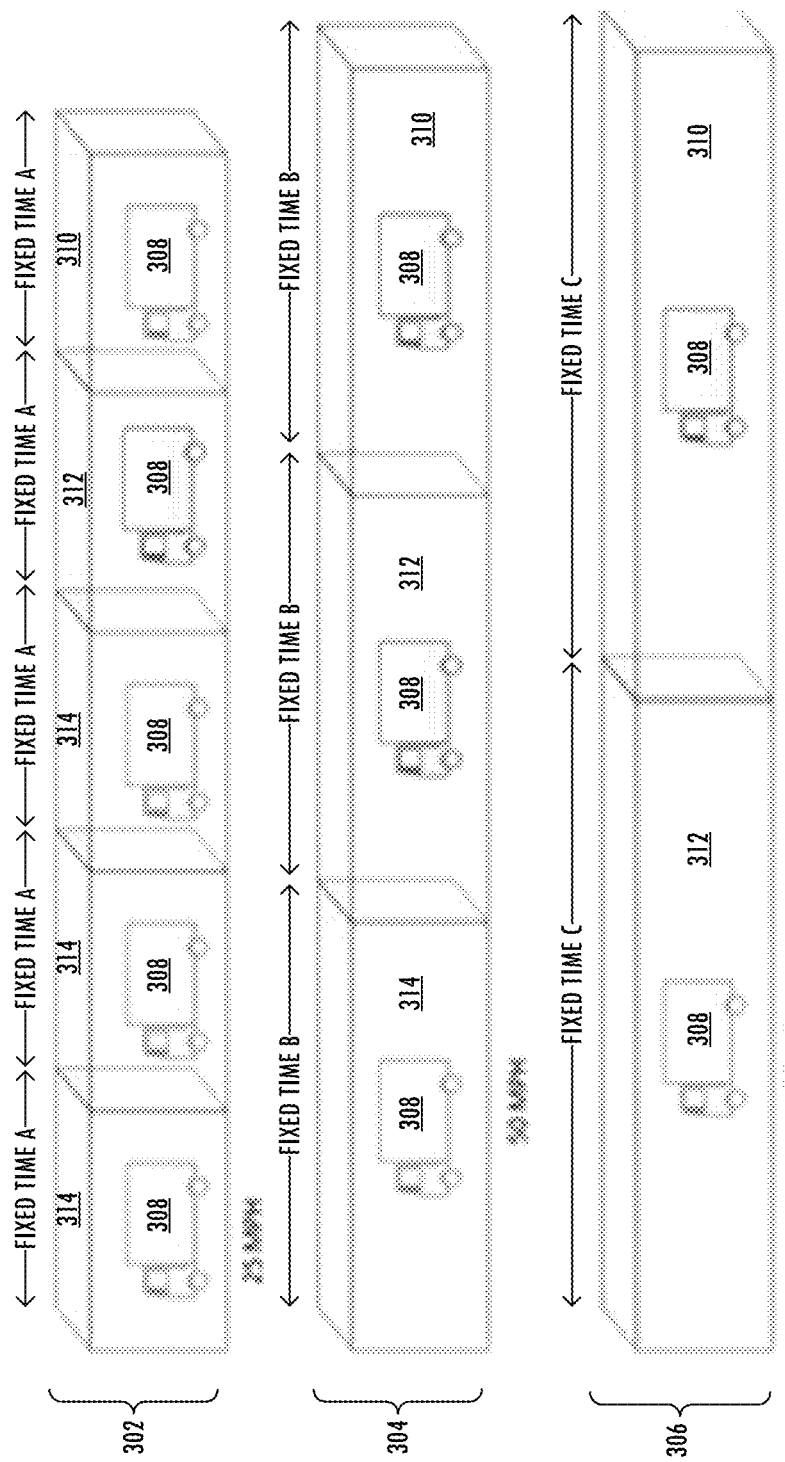
FIG. 3 illustrates a suitable physical object and geometric segments, according to example implementations of the present disclosure.

To further illustrate example implementations of the present disclosure, reference will now be made to FIGS. 3-5. FIG. 3 illustrates three suitable sequences of geometric segments 302, 304, 306 that have a physical object 308 (e.g., land vehicle) therein. More particularly, the sequences illustrate the physical object moving from a current geometric segment 310 to a next geometric segment 312, and in some instances at least one other geometric segment 314 thereafter. As shown, each geometric segment includes a dimension such as a fixed time A, B, C at which the physical object traverses the geometric segment and the fixed time may be directly proportional to the speed of the physical object within the geometric segment. For example, as the fixed time increases from A to B, the speed of the physical object also increases from 25 miles per hour (mph) to 50 mph, and as the fixed time increases from B to C, the speed of the physical object increases from 50 mph to 75 mph.

FIG. 4 more particularly illustrates the system 100 of FIG. 4 operatively coupled to a plurality of physical objects 402 (aircraft, land vehicles) within a 3D navigable region of an environment. As shown, in some examples, the segmentation engine 102 and the optimization engine 104 may also be coupled to an object database 106 that includes historical information related to the physical object. In some examples, the system 100 may also be connected to a number of external systems for receiving data. For example, the system may receive performance and maintenance data for the physical object, research and design data for the physical object and segment analysis, sequencing, and resource preservation data which may include data from event management services, the department of transportation, traffic services, law enforcement agencies, weather services and the like.

As also shown in FIG. 4, either or both the segmentation engine 102 or the optimization engine 104 may be composed of distributed subsystems that are each configured to perform or manage a respective function thereof. For example, the segmentation engine may include an object definition manager 102A that comprises design and operational parameters, an object segment manager 102B, a space segment definition manager 102C, and a geometric segment historical database 102D. The optimization engine, and more particularly the assignment engine 202, analyzer 204, and authorization engine 206, may include an object analysis engine 104A, an object operation manager 104B, a segment analysis engine 104C, an environment analysis engine 104D, an active object analysis engine 104E, an active segment analysis engine 104F and analysis aggregation engine 104G. The function of these engines and managers (which in some examples may be referred to as controllers) is further detailed hereinafter.

The object analysis engine 104A may otherwise be referred to as a physical object (e.g., a vehicle) analysis optimization engine that stores active operational parameters of the physical object. For example, the object analysis engine may be or include a database or server that collects and analyzes the operational characteristics of the physical object to determine the active operational parameters of the physical object.

The object operation manager 104B may otherwise be referred to as a physical object operation management engine that may be or include a database or server that monitors the operational parameters of the physical object. Input from the object analysis engine 104A may be utilized thereby to manage the operational parameters of the physical object.

The segment analysis engine 104C may otherwise be referred to as a geometric segment analysis and planning optimization engine that may be or include a database or server that analyzes the environmental and operational conditions of the geometric segment.

The environment analysis engine 104D may be or include a database or server that evaluates the environmental conditioned of a defined geometric segment). The active object analysis engine 104E may otherwise be referred to as an active physical object analysis and optimization engine(s) that store active operational parameters of the physical object. In particular, the object analysis engine may be or include a database or server that monitors and analyzes the active operational parameters of a physical object in which the active operational parameters may refer to operational parameters of the physical object while in motion.

The active segment analysis engine 104F may otherwise be referred to as an active geometric segment optimization engine that may be or include a database or server that monitors and analyzes the environmental and operational parameters of an active geometric segment. The active geometric segment may refer to a defined geometric segment having a physical object in motion therein.

The analysis aggregation engine 104G may otherwise be referred to as an active physical objects and geometric segments analysis, aggregation and optimization engine. The analysis aggregation engine may be or include a database or server that aggregates data from the physical object analysis and geometric segment analysis to determine the optimal geometric segment definition for the physical object and control the authorization of the physical to enter a geometric segment.

FIG. 5 illustrates a flowchart including various operations of a method 500 for directing movement of a physical object from a location to a destination within a 3D navigable region of an environment. As shown at block 502, the method may include dividing a navigable region into a plurality of geometric segments between a location and a destination that are assignable to a physical object. Each geometric segment has a dimension that is proportional to operational parameters of the physical object and includes at least a speed of the physical object therein. The method may also include assigning a sequence of geometric segments from the location to the destination for movement of the physical object. The geometric segments of the sequence are assigned incrementally, as shown at block 504.

FIG. 6 illustrates a flowchart including various operations of the method step 504 for assigning the sequence of geometric segments from the location to the destination for movement of the physical object. As shown at block 602, the method step may include assigning a next geometric segment to the physical object moving in a current geometric segment in the sequence based on at least a predefined goal and priority ranking of the physical object. The method step may also include analyzing the next geometric segment based on operational parameters including at least a speed of the physical object in the current geometric segment and a condition of the environment in the next geometric segment, and based thereon in at least one increment, adjusting the dimension of the next geometric segment that is proportional to the operational parameters including at least the speed of the physical object, and reassigning the next segment to the physical object based on the dimension so adjusted, as shown at block 604. Thereafter, the method step may also include directing the physical object to move from the current geometric segment into the next geometric segment, as shown at block 606.

For example, a road (e.g., navigable region) may be divided into a plurality of geometric segments between a location and a destination in which a sequence of the geometric segments is incrementally assigned to a land vehicle (e.g., physical object) from the location to the destination for movement of the land vehicle along the road. In particular, while the land vehicle is moving along the road and within a current geometric segment, a next geometric segment may be assigned thereto based on at least a predefined goal and priority ranking of the land vehicle. In at least one increment, the dimensions of the next geometric segment may be adjusted based on an analysis of the speed of the vehicle within the current segment and the conditions of the road. The next geometric segment may then be reassigned to the land vehicle, and the land vehicle may be directed to move from the current geometric segment into the next geometric segment.

According to example implementations of the present disclosure, the system 100 and its subsystems and/or components including the segmentation engine 102 and optimization engine 104 may be implemented by various means. Similarly, the optimization engine 200 and its respective subsystems and/or components may be implemented by various means. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

FIG. 7 illustrates an apparatus 700 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 702 (e.g., processor unit) connected to a memory 704 (e.g., storage device).

The processor 702 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 704 (of the same or another apparatus).

The processor 702 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 704 is generally any piece of computer hardware that is capable of storing information such as, for example, data, computer programs (e.g., computer-readable program code 706) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface 708 (e.g., communications unit) and/or one or more user interfaces. The communications interface 708 may be configured to transmit and/or receive information, such as to and/or from other apparatus(es), network(s) or the like. The communications interface 708 may be configured to transmit and/or receive information by physical (wired) and/or wireless communications links. Examples of suitable communication interfaces include a network interface controller (NIC), wireless NIC (WNIC) or the like.

The user interfaces may include a display 710 and/or one or more user input interfaces 712 (e.g., input/output unit). The display may be configured to present or otherwise display information to a user, suitable examples of which include a liquid crystal display (LCD), light-emitting diode display (LED), plasma display panel (PDP) or the like.

The user input interfaces 712 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 700 may include a processor 702 and a computer-readable storage medium or memory 704 coupled to the processor, where the processor is configured to execute computer-readable program code 706 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for directing movement of a physical object from a location to a destination within a three-dimensional (3D) navigable region of an environment, the apparatus comprising a processor and a memory storing executable instructions that, in response to execution by the processor, cause the apparatus to:

divide the navigable region into a plurality of geometric segments between the location and the destination that are assignable to the physical object, each geometric segment having a dimension proportional to operational parameters of the physical object including at least a speed of the physical object;

assign a sequence of geometric segments from the location to the destination for movement of the physical object, the geometric segments of the sequence being assigned incrementally including in each increment, the apparatus being caused to at least:

assign a next geometric segment to the physical object moving in a current geometric segment in the sequence;

analyze the next geometric segment based on the operational parameters of the physical object in the current geometric segment and a condition of the environment in the next geometric segment, and based thereon in at least one increment, adjust the dimension of the next geometric segment that is proportional to the operational parameters of the physical object, and reassign the next geometric segment to the physical object based on the dimension so adjusted; and thereafter, direct the physical object to move from the current geometric segment into the next geometric segment so assigned, or into the next geometric segment so reassigned in the at least one increment.

2. The apparatus of claim 1, wherein the apparatus being caused to adjust the dimension of the next geometric segment includes being caused to subdivide the next geometric segment into geometric sub-segments along the dimension that is proportional to the operational parameters of the physical object, and being caused to reassign the next geometric segment includes being caused to assign at least some but not all of the geometric sub-segments to the physical object.

3. The apparatus of claim 1, wherein the apparatus being caused to adjust the dimension of the next geometric segment includes being caused to combine the next geometric segment with an adjacent geometric segment to produce a combined geometric segment, and being caused to reassign the next geometric segment includes being caused to assign the combined geometric segment to the physical object.

4. The apparatus of claim 1, wherein each of the plurality of geometric segments has a respective plurality of dimensions including a dimension proportional to the operational parameters of the physical object, and that are defined to enable safe movement of the physical object.

5. The apparatus of claim 1, wherein the apparatus being caused to analyze the next geometric segment includes being caused to analyze the next geometric segment based on the operational parameters further including at least one of a design weight, active weight, electromagnetic signature, motion energy, acceleration, depth of tire tread or thickness of brake lining of the physical object.

6. The apparatus of claim 1, wherein the apparatus being caused to assign the next geometric segment includes being caused to assign the next geometric segment based on at least a priority ranking of the physical object relative others of a plurality of physical objects including the physical object to which the plurality of geometric segments are assignable, each geometric segment being assignable to only one of the plurality of physical objects at a time.

7. The apparatus of claim 6, wherein in at least one increment, the apparatus being caused to assign the next geometric segment includes being caused to assign the next geometric segment to the physical object over another of the plurality of physical objects having a lower priority ranking.

8. A method for directing movement of a physical object from a location to a destination within a three-dimensional (3D) navigable region of an environment, the method comprising:

dividing the navigable region into a plurality of geometric segments between the location and the destination that are assignable to the physical object, each geometric segment having a dimension proportional to operational parameters of the physical object including at least a speed of the physical object;

assigning a sequence of geometric segments from the location to the destination for movement of the physical object, the geometric segments of the sequence being assigned incrementally, including in each increment:

assigning a next geometric segment to the physical object moving in a current geometric segment in the sequence;

analyzing the next geometric segment based on the operational parameters of the physical object in the current geometric segment and a condition of the environment in the next geometric segment, and based thereon in at least one increment, adjusting the dimension of the next geometric segment that is proportional to the operational parameters of the physical object, and reassigning the next segment to the physical object based on the dimension so adjusted; and thereafter, directing the physical object to move from the current geometric segment into the next geometric segment so assigned, or into the next geometric segment so reassigned in the at least one increment.

9. The method of claim 8, wherein adjusting the dimension of the next geometric segment includes subdividing the next geometric segment into geometric sub-segments along the dimension that is proportional to the operational parameters of the physical object, and reassigning the next geometric segment includes assigning at least some but not all of the geometric sub-segments to the physical object.

10. The method of claim 8, wherein adjusting the dimension of the next geometric segment includes combining the next geometric segment with an adjacent geometric segment to produce a combined geometric segment, and reassigning the next geometric segment includes assigning the combined geometric segment to the physical object.

11. The method of claim 8, wherein each of the plurality of geometric segments has a respective plurality of dimensions including a dimension proportional to the operational parameters including at least the speed of the physical object, and that is defined to enable safe movement of the physical object therein.

12. The method of claim 8, wherein analyzing the next geometric segment includes analyzing the next geometric segment based on at least one of a design weight, active weight, electromagnetic signature, motion energy, acceleration, depth of tire tread or thickness of brake lining of the physical object.

13. The method of claim 8, wherein assigning the next geometric segment includes assigning the next geometric segment based on at least a priority ranking of the physical object relative others of a plurality of physical objects including the physical object to which the plurality of geometric segments are assignable, each geometric segment being assignable to only one of the plurality of physical objects at a time.

14. The method of claim 13, wherein in at least one increment, assigning the next geometric segment includes assigning the next geometric segment to the physical object over another of the plurality of physical objects having a lower priority ranking.

15. A computer-readable storage medium for directing movement of a physical object from a location to a destination within a three-dimensional (3D) navigable region of an environment, the computer-readable storage medium having computer-readable program code stored therein that, in response to execution by a processor, cause an apparatus to at least:
  divide the navigable region into a plurality of geometric segments between the location and the destination that are assignable to the physical object, each geometric segment having a dimension proportional to operational parameters of the physical object including at least a speed of the physical object;
  assign a sequence of geometric segments from the location to the destination for movement of the physical object, the geometric segments of the sequence being assigned incrementally including in each increment, the apparatus being caused to at least:
    assign a next geometric segment to the physical object moving in a current geometric segment in the sequence;
    analyze the next geometric segment based on the operational parameters of the physical object in the current geometric segment and a condition of the environment in the next geometric segment, and based thereon in at least one increment, adjust the dimension of the next geometric segment that is proportional to the operational parameters of the physical object, and reassign the next geometric segment to the physical object based on the dimension so adjusted; and thereafter,
    direct the physical object to move from the current geometric segment into the next geometric segment so assigned, or into the next geometric segment so reassigned in the at least one increment.

16. The computer program product of claim 15, wherein the apparatus being caused to adjust the dimension of the next geometric segment includes being caused to subdivide the next geometric segment into geometric sub-segments along the dimension that is proportional to the operational parameters of the physical object, and being caused to reassign the next geometric segment includes being caused to assign at least some but not all of the geometric sub-segments to the physical object.

17. The computer program product of claim 15, wherein the apparatus being caused to adjust the dimension of the next geometric segment includes being caused to combine the next geometric segment with an adjacent geometric segment to produce a combined geometric segment, and being caused to reassign the next geometric segment includes being caused to assign the combined geometric segment to the physical object.

18. The computer program product of claim 15, wherein each of the plurality of geometric segments has a respective plurality of dimensions including the dimension proportional to the operational parameters including at least the speed of the physical object, and that is defined to enable safe movement of the physical object therein.

19. The computer program product of claim 15, wherein the apparatus being caused to analyze the next geometric segment includes being caused to analyze the next geometric segment based on at least one of a design weight, active weight, electromagnetic signature, motion energy, acceleration, depth of tire tread or thickness of brake lining of the physical object.

20. The computer program product of claim 15, wherein the apparatus being caused to assign the next geometric segment includes being caused to assign the next geometric segment based on at least a priority ranking of the physical object relative others of a plurality of physical objects including the physical object to which the plurality of geometric segments are assignable, each geometric segment being assignable to only one of the plurality of physical objects at a time.

21. The computer program product of claim 20, wherein in at least one increment, the apparatus being caused to assign the next geometric segment includes being caused to assign the next geometric segment to the physical object over another of the plurality of physical objects having a lower priority ranking.

* * * * *